United States Patent
Ye et al.

(10) Patent No.: US 9,667,336 B2
(45) Date of Patent: May 30, 2017

(54) METHOD AND APPARATUS FOR DYNAMIC SPECTRUM MANAGEMENT

(75) Inventors: Chunxuan Ye, Wayne, PA (US);
Alpaslan Demir, East Meadow, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 293 days.

(21) Appl. No.: 13/110,263

(22) Filed: May 18, 2011

(65) Prior Publication Data

US 2011/0286381 A1    Nov. 24, 2011

Related U.S. Application Data

(60) Provisional application No. 61/345,853, filed on May 18, 2010.

(51) Int. Cl.
| | | |
|---|---|---|
| H04B 7/155 | (2006.01) | |
| H04W 24/00 | (2009.01) | |
| H04W 84/04 | (2009.01) | |
| H04B 17/309 | (2015.01) | |

(52) U.S. Cl.
CPC ........... *H04B 7/155* (2013.01); *H04B 17/309* (2015.01); *H04W 24/00* (2013.01); *H04W 84/047* (2013.01)

(58) Field of Classification Search
USPC .......................................................... 370/315
See application file for complete search history.

(56) References Cited

U.S. PATENT DOCUMENTS

| | | | | |
|---|---|---|---|---|
| 4,649,515 | A | * | 3/1987 | Thompson et al. ............ 706/52 |
| 2008/0036593 | A1 | * | 2/2008 | Rose-Pehrsson ...... G08B 17/00 340/540 |
| 2009/0016609 | A1 | * | 1/2009 | Zakrzewski ....... B64D 45/0015 382/190 |
| 2009/0034508 | A1 | | 2/2009 | Gurney et al. |
| 2009/0247201 | A1 | | 10/2009 | Ye et al. |
| 2010/0034097 | A1 | | 2/2010 | Nitta et al. |
| 2010/0103924 | A1 | * | 4/2010 | Rao ...................... H04W 16/14 370/351 |
| 2010/0318641 | A1 | * | 12/2010 | Bullard ................. H04L 43/065 709/223 |

OTHER PUBLICATIONS

Akhtar et al., "Grouping Technique for Cooperative Spectrum Sensing in Cognitive Radios," $2^{nd}$ International Workshop on Cognitive Radio and Advanced Spectrum Management, pp. 80-85 (May 2009).

(Continued)

*Primary Examiner* — Sulaiman Nooristany
(74) *Attorney, Agent, or Firm* — Condo Roccia Koptiw LLP

(57) ABSTRACT

Methods and apparatus for dynamic spectrum management are disclosed. A node receives a request for sensing related information. In response to receiving the request, the node transmits the sensing related information. The sensing related information may include at least one of information about data fusion methods supported by the node, information about relaying methods supported by the node and information about at least one other node that is reachable from the node.

23 Claims, 13 Drawing Sheets

(56) References Cited

OTHER PUBLICATIONS

Ben Letaief et al., "Cooperative Communications for Cognitive Radio Networks," Proceedings of the IEEE, vol. 97, No. 5, pp. 578-893 (May 2009).
Broderson et al., "CORVUS: A Cognitive Radio Approach for Usage of Virtual Unlicensed Spectrum," White Paper (Jul. 2004) available at http://bwrc.eecs.berkeley.edu/research/mcma/CR_White_paper_final1.pdf (last visited Aug. 1, 2011).
Bush et al., "Some Internet Architectural Guidelines and Philosophy," Network Working Group, Request for Comments: 3439 (Dec. 2002).
Carpenter, "Architectural Principles of the Internet," Network Working Group, Request for Comments: 1958 (Jun. 1996).
Chair et al., "Optimal Data Fusion in Multiple Sensor Detection Systems," IEEE Transactions on Aerospace and Electronic Systems, vol. 22, No. 1, pp. 98-101 (Jan. 1986).
Chamberland et al., "Decentralized Detection in Sensor Netowks," IEEE Transactions on Signal Processing, vol. 51, No. 2, pp. 407-416 (Feb. 2003).
Cheng et al., "Optimal bandwidth assignment for distributed sequential detection," Proceedings of the Fifth International Conference on Information Fusion, vol. 1, pp. 49-55 (Jul. 2002).
Denker et al., "A Policy Engine for Spectrum Sharing," 2nd IEEE International Symposium on New Frontiers in Dynamic Spectrum Access Networks, pp. 55-65 (Apr. 2007).
Denker et al., "Cognitive Policy Radio Language (CoRaL): A Language for Spectrum Policies XG Policy Language", Version 0.1, ICS-16763-TR-07-001 (Apr. 1, 2007).
Digham et al., "On the Energy Detection of Unknown Signals over Fading Channels," IEEE International Conference on Communications, vol. 5, pp. 3575-3579 (May 2003).
Draft Standard for Spectrum Sensing Interfaces and Data Structures for Dynamic Spectrum Access and other Advanced Radio Communication Systems, IEEE P1900.6 D1 (Apr. 2010).
European Telecommunications Standards Institute, "Reconfigurable Radio Systems (RRS); Functional Architecture (FA) for the Management and Control of Reconfigurable Radio Systems," ETSI TR 102 682 V1.1.1 (Jul. 2009).
Federal Communications Commission, "Notice of Proposed Rule Making", ET Docket No. 04-113, (May 25, 2004).
Federal Communications Commission, "Second Report and Order and Memorandum Opinion and Order", ET Docket No. 04-186, ET Docket No. 02-380, (Nov. 14, 2008).
Hu et al., "On the Optimality of Finite-Level Quantization for Distributed Signal Detection," IEEE Transactions on Information Theory, vol. 47, Issue 4, pp. 1665-1671 (May 2001).
IEEE Standard for Architectural Building Blocks Enabling Network-Device Distributed Decision Making for Optimized Radio Resource Usage in Heterogeneous Wireless Access Networks, IEEE Std. 1900.4-2009 (Feb. 2009).
Jiang et al., "Fusion of censored decisions in wireless sensor networks," IEEE Transactions on Wireless Communications, , vol. 4, Issue 6, pp. 2668-2673 (Nov. 2005).
Lin et al., "Decision fusion rules in multi-hop wireless sensor networks," IEEE Transactions on Aerospace and Electronic Systems, vol. 41, Issue 2 (Apr. 2005).
Liu et al., "Exploiting the finite-alphabet property for cooperative relays," IEEE International Conference on Acoustics, Speech, and Signal Processing, vol. 3, pp. 357-360 (Mar. 2005).
Ma et al., "Soft Combination and Detection for Cooperative Spectrum Sensing in Cognitive Radio Networks," IEEE Global Telecommunications Conference, pp. 3139-3143 (Nov. 2007).
National Telecommunications and Information Administration, "United States Frequency Allocations: The Radio Spectrum," (Oct. 2003) available at http://www.ntia.doc.gov/osmhome/allochrt.pdf (last visited Aug. 1, 2011).
Niu et al., "Fusion of decisions transmitted over Rayleigh fading channels in wireless sensor networks," IEEE Transactions on Signal Processing, vol. 54, Issue 3, pp. 1018-1027 (Mar. 2006).
Peh et al., "Optimization for Cooperative Sensing in Cognitive Radio Networks." Proceedings of the IEEE Wireless Communications Networking Conference, pp. 27-32 (Mar. 2007).
Qi et al., "Weighted-Clustering Cooperative Spectrum Sensing in Cognitive Radio Context," International Conference on Communications and Mobile Computing, pp. 102-106 (Jan. 2009).
Sowa, "Common Logic Controlled English," 2004 available at http://www.jfsowa.com/clce/specs.htm (last visited Aug. 1, 2011).
Stevenson et al., "IEEE 802.22: The First Cognitive Radio Wireless Regional Area Network Standard," IEEE Standards and Networking, IEEE Communications Magazine, vol. 47, No. 1 (Jan. 2009).
Thomopoulos et al., "Distributed Decision Fusion in the Presence of Networking Delays and Channel Errors," Information Sciences, vol. 66, pp. 91-118 (1992).
Wang et al., "A combined decision fusion and channel coding scheme for distributed fault-tolerant classification in wireless sensor networks," IEEE Transactions on Wireless Communications, vol. 5, Issue 7, pp. 1695-1705 (Jul. 2006).
Wei et al., "Energy Efficient Distributed Spectrum Sensing for Wireless Cognitive Radio Networks," IEEE Conference on Computer Communications Workshop, pp. 1-6 (Mar. 2010).
Yi et al., "Optimal Fusion Scheme in Wireless Sensor Networks Under Sum-Rate Capacity Constraint," 44th Annual Conference on Information Sciences and Systems (CISS), pp. 1-4 (Mar. 2010).
Yucek et al., "A Survey of Spectrum Sensing Algorithms for Cognitive Radio Applications," IEEE Communications Surveys & Tutorials, vol. 11, Issue 1, pp. 116-130 (2009).
Zhao et al., "Performance Evaluation of Cognitive Radios: Metrics, Utility Functions, and Methodology," Proceedings of the IEEE, vol. 97, No. 4, pp. 642-659 (Apr. 2009).
Zhao et al., "Radio environment map enabled situation-aware cognitive radio learning algorithms," Proceedings of the SDR Technical Conference and Product Exposition, pp. 1-6 (2007).

\* cited by examiner

METHOD AND APPARATUS FOR DYNAMIC SPECTRUM MANAGEMENT

CROSS REFERENCE TO RELATED APPLICATIONS

This application claims the benefit of U.S. Provisional Application No. 61/345,853, filed on May 18, 2010, the contents of which are incorporated by reference herein.

BACKGROUND

Most of the radio spectrum in the United States has already been allocated for use by some type of wireless device. This leaves very little unallocated spectrum available for new wireless devices. It is predicted that with the rapid growth of global mobile network data traffic, we will face increasingly severe bandwidth shortage (i.e., a bandwidth crunch). However, while most of the radio spectrum has already been allocated, measurements have shown that most of the allocated spectrum is only lightly utilized at any given point in time. The obvious inefficient use of the radio spectrum has motivated a closer look at the current spectrum regulatory policies and spurred the advent of technologies such as dynamic spectrum management (DSM) and cognitive radios, which may offer solutions to the bandwidth crunch problem.

SUMMARY

Methods and apparatus for dynamic spectrum management are disclosed. In an embodiment, a node receives a request for sensing related information. In response to receiving the request, the node transmits the sensing related information. The sensing related information may include at least one of information about data fusion methods supported by the node, information about relaying methods supported by the node and information about at least one other node that is reachable from the node.

BRIEF DESCRIPTION OF THE DRAWINGS

A more detailed understanding may be had from the following description, given by way of example in conjunction with the accompanying drawings wherein.

DETAILED DESCRIPTION

Figure 1A:
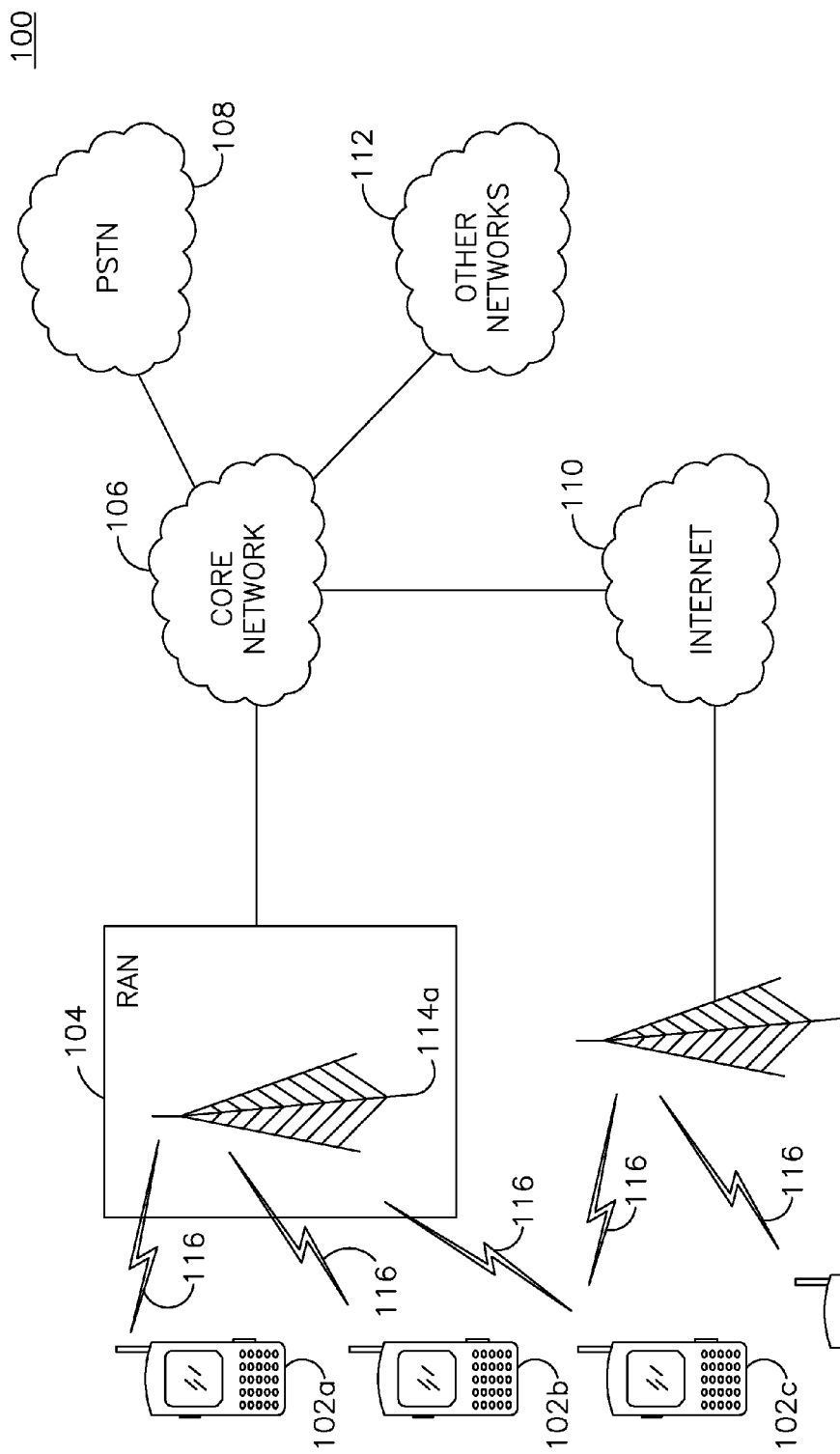
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
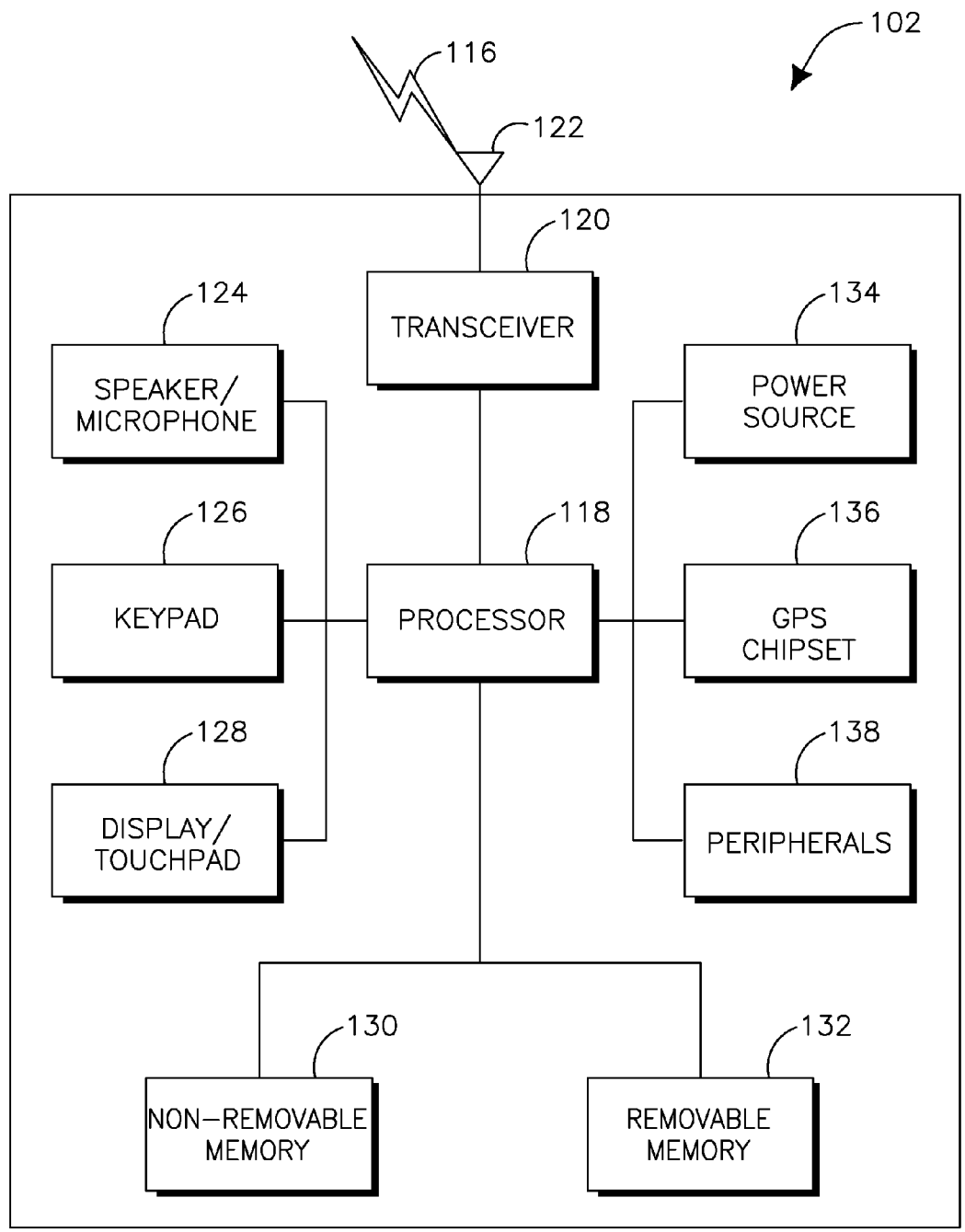
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
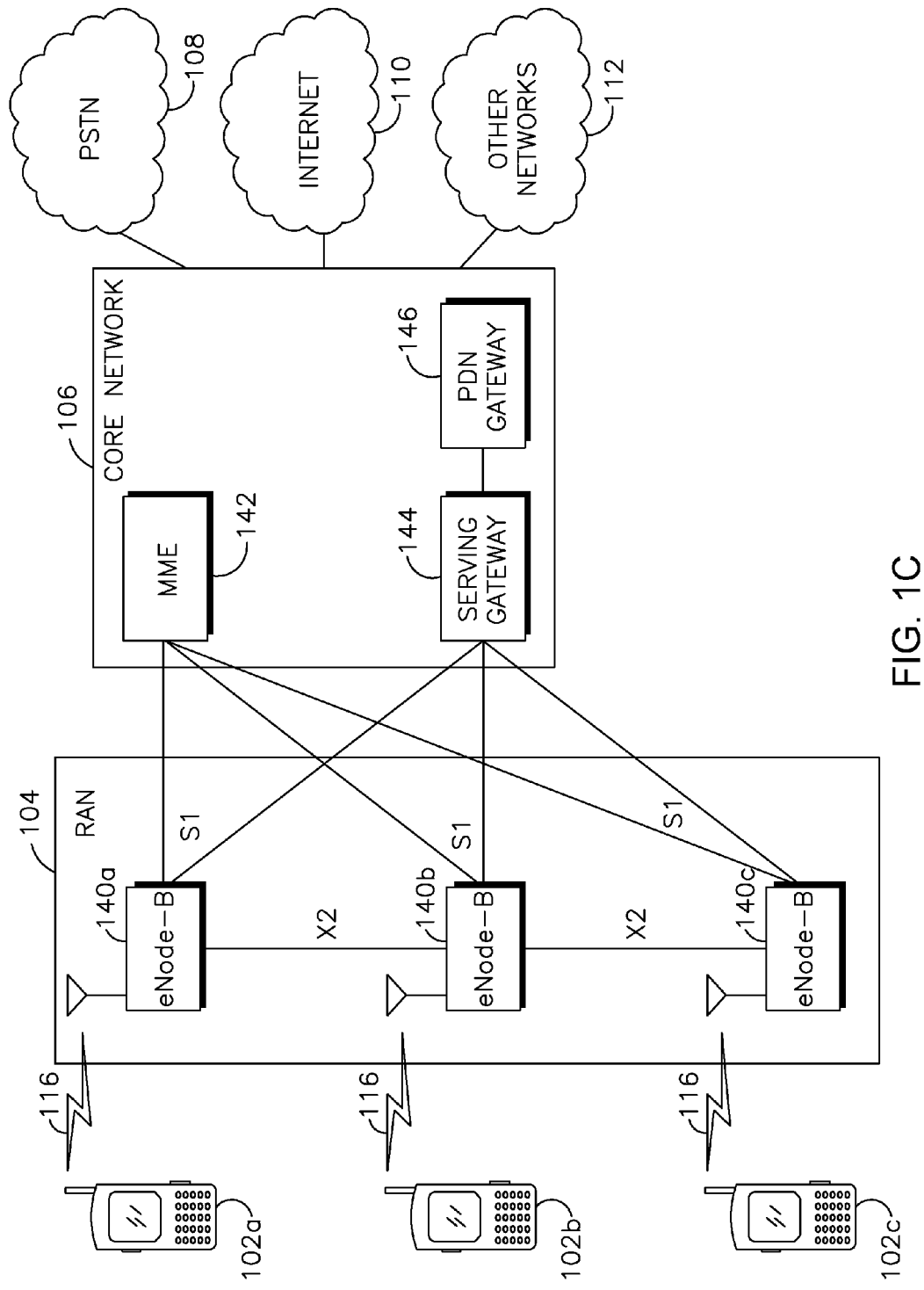
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In dynamic spectrum management (DSM) and cognitive radio, secondary users may temporarily use spectrum that is not being used by primary (or licensed) users. To determine whether the spectrum is being used at a given time, one or more nodes (e.g., sensory nodes) may sense the spectrum using spectrum sensing techniques such as energy detector-based sensing, waveform-based sensing, cyclostationarity-based sensing, radio identification-based sensing and matched-filtering. Then, a decision may be made as to whether the spectrum is being used based on the sensing results provided by the one or more nodes.

Due to noise uncertainty and wireless channel fading, the sensing decision made by a single sensory node may be unreliable. Cooperative sensing among multiple sensory nodes may be more efficient because it may provide multiple measurements and, therefore, increase diversity. Additionally, having sensory nodes cooperating over a wide area may provide a possible solution to the hidden-terminal problem since sensory nodes separated by a distance larger than the correlation distance of shadow fading are unlikely to be shadowed simultaneously from the primary user.

In cooperative sensing, after performing the spectrum sensing operations, each sensory node may send its sensing results to a data fusion center, which may make an overall decision about the spectrum occupancy. The process of making an overall decision based on multiple sensing results may be referred to as "data fusion" or "information combining."

Fusion channels (from sensory nodes to the data fusion center) may be wireless channels, and transmissions of sensing results on these channels may experience fading and noise. Transmission errors on the fusion channels may lead to a very low overall detection probability. For reliable transmissions on the fusion channels, the transmission power of sensory nodes should be high. This may be infeasible, however, because sensory nodes may be power-limited and may cause interference. Further, the data fusion center may receive many sets of sensing results, which may cause a communication bottleneck at the data fusion center.

Embodiments described herein include fusion helper nodes and relay nodes. A fusion helper node may combine the sensing results received from multiple sensory nodes and transmit the combined sensing results to the data fusion center. A relay node may forward signals received from sensory nodes to the data fusion center. Use of fusion helper nodes and relay nodes may reduce or eliminate communication bottlenecks at the data fusion center and transmission errors on the fusion channels. While the embodiments that follow may be described in terms of a single relay node serving a single sensory node, a single relay node may serve multiple sensory nodes and a single sensory node may be served by multiple relay nodes. Further, the "relay node" may refer to a static relay node or a dynamic node and the term "fusion helper node" may refer to a static fusion helper node or a dynamic node.

Figure 1D:
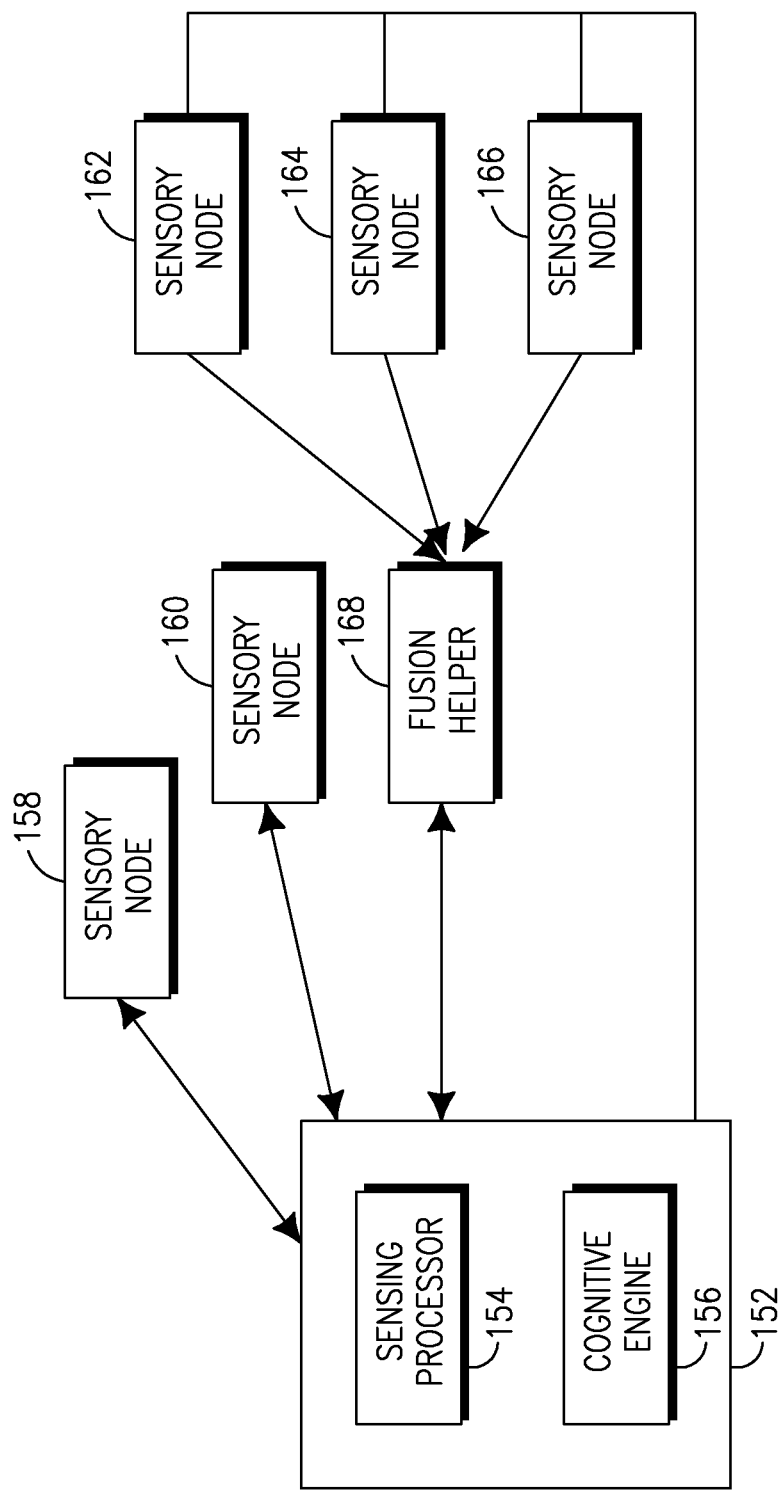
FIG. 1D is a block diagram of an example radio frequency (RF) sensing network with fusion helper nodes.

FIG. 1D is a block diagram of an example radio frequency (RF) spectrum sensing network 150. The illustrated network 150 includes a data fusion center 152 and nodes 158, 160, 162, 164, 166 and 168. In the illustrated example, nodes 158, 160, 162, 164 and 166 are sensory nodes, node 168 is a fusion helper node and the data fusion center 152 includes a sensing processor 154 and a cognitive engine 156. Also, the data fusion center 152 is a DSM unit 152, which may provide information to secondary users about which frequency bands to use and instruct secondary users how to use those frequency bands. The sensing processor 154 of the DSM unit 152 (described below and illustrated in FIGS. 1D, 2 and 3) may provide information about which frequency bands are not currently occupied by primary users. The sensing processor 154 may control many sensory nodes (e.g., nodes 162, 164 and 166) for cooperative sensing.

Each sensory node involved in a sensing task (described in more detail below) may send its sensing results to the sensing processor 154, which may combine all the results to form an overall sensing decision for the task. Alternatively, some or all of the sensory nodes involved in a sensing task may send their sensing results to a fusion helper node (e.g., fusion helper node 168), which may combine all of the results it receives and forward the combined result to the sensing processor 154. In the example illustrated in FIG. 1D, the sensory nodes 158 and 160 have been instructed to send their sensing results directly to the sensing processor 154 and the sensory nodes 162, 164 and 166 have been instructed to send their sensing results to the fusion helper node 168. This reduces the number of signals sent to the sensing processor 154 from five to three, alleviating any communication bottleneck that may have otherwise been present at the DSM unit 152.

Figure 2:
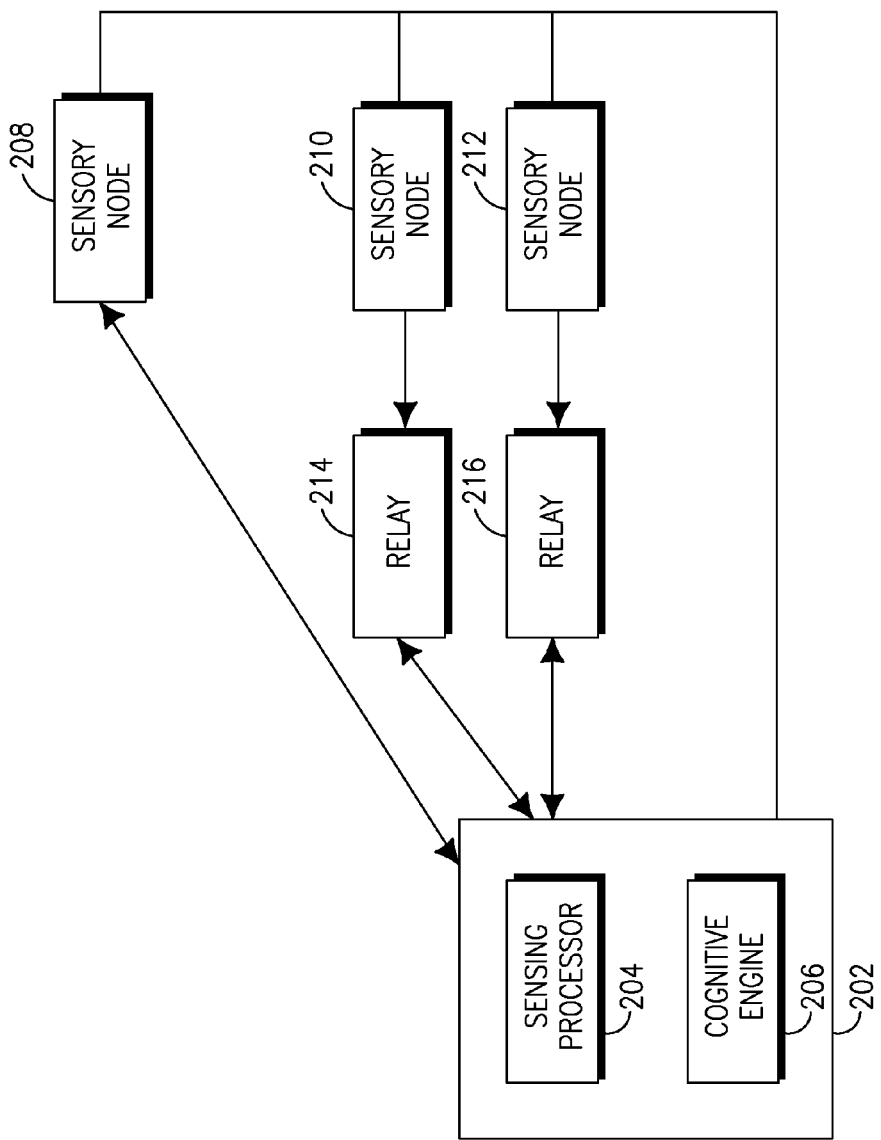
FIG. 2 is a block diagram of an example RF sensing network with relay nodes.

FIG. 2 is a block diagram of an example RF spectrum sensing network 200. The illustrated network 200 includes a DSM unit 202 and nodes 208, 210, 212, 214 and 216. In the illustrated example, nodes 208, 210 and 212 are sensory nodes, nodes 214 and 216 are relay nodes and the DSM unit 202 includes a sensing processor 204 and a cognitive engine 206.

As with the network 150 illustrated in FIG. 1D, in the network 200 illustrated in FIG. 2, each sensory node involved in a sensing task (described in more detail below) may send its sensing results to the sensing processor 204, which may combine all the results to form an overall sensing decision for the task. Alternatively, in the network 200 illustrated in FIG. 2, some or all of the sensory nodes involved in a sensing task may send their sensing results to a relay node (e.g., relay node 214 and/or 216), which may forward all of the results it receives to the sensing processor 204. In the example illustrated in FIG. 2, the sensory node 208 has been instructed to send its sensing results directly to the sensing processor 204, the sensory node 210 has been instructed to send its sensing results to the relay node 214 and the sensory node 212 has been instructed to send its sensing results to the relay node 216. The relay nodes (e.g., relay nodes 214 and 216) may perform some type of processing (e.g., amplifying) on the signals they receive before forwarding them on to the sensing processor 204. Thus, use of relay nodes may help to reduce transmission errors on the fusion channels, particularly where the network 200 includes sensory nodes that may be located far from the DSM unit 200.

Figure 3:
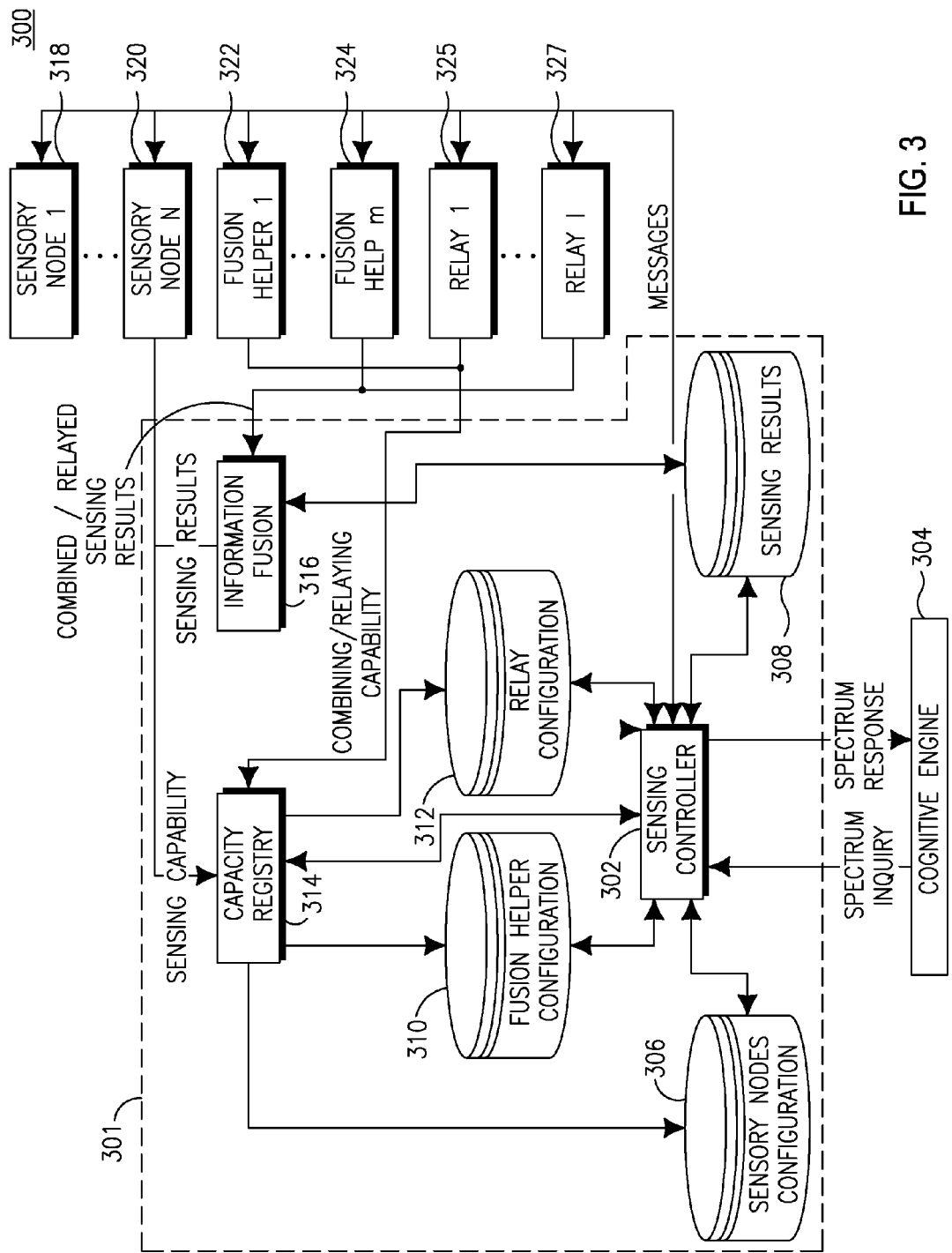
FIG. 3 is a block diagram of an example architecture of a dynamic spectrum management (DSM) sensing processor for an example RF sensing network.

FIG. 3 is a block diagram of an example architecture of a DSM sensing processor 301 for an example RF spectrum sensing network 300. The illustrated network 300 includes the DSM sensing processor 301, a cognitive engine 304 and nodes 318, 320, 322, 324, 325 and 327. The illustrated nodes 318 and 320 are sensory nodes, the illustrated nodes 322 and 324 are fusion helper nodes and the illustrated nodes 325 and 327 are relay nodes. As indicated in FIG. 3, any number of sensory nodes 1-n, fusion helper nodes 1-m and relay nodes 1-l may be included in the network. While separate sensory, fusion helper and relay nodes are illustrated in FIG. 3, dynamic nodes that are capable of acting as one or more of sensory nodes, fusion helper nodes and relay nodes may also be included in an RF spectrum sensing network. The illustrated DSM sensing processor 301 includes a sensing controller 302, a capability registry 314, an information fusion unit 316, a fusion helper configuration database 310, a relay configuration database 312, a sensory nodes configuration database 306 and a sensing results database 308. RF spectrum sensing networks may include more or less units than illustrated in the example of FIG. 3. For example, for a network that does not include fusion helper nodes, the fusion helper configuration database 310 may not be included. Similarly, for a network that does not include relay nodes, the relay configuration database 312 may not be included. By way of another example, for a network that includes dynamic nodes, the fusion helper and relay configuration databases 310 and 312 may not be included because, in an embodiment, the sensory nodes configuration database 306 may assume their functionalities.

The information fusion unit 316 may combine sensing results received from sensory nodes 318 and 320, relay nodes 322 and 324 and/or fusion helper nodes 325 and 327. Based at least on the received sensing results, the information fusion unit 316 may make an overall decision as to whether a certain spectrum is occupied by primary users. The information fusion unit 316 may store the overall decision, and potentially other related information, in the sensing results database 308. Because the sensing results from each fusion helper node 322 and 324 may be combined from several sensory nodes, the results may be more reliable than those received directly from the sensory nodes. Thus, sensing results received from fusion helper nodes may play a more significant role in final combining operations. Depending on which fusion scheme(s) is/are to be used, the information fusion unit 316 may also retrieve data from the sensing results database 308 in order to carry out a fusion operation.

Different fusion helper nodes may be configured to combine sensing results using one or more different combining techniques. Combining techniques may be classified into three categories: hard combining, hard combining with side information and soft combining.

In hard combining, each sensory node in a network may send a DSM unit a binary decision as to whether a signal is present on the spectrum. An example hard combining rule is the k-out-of-n-rule, which may reduce to the "AND" rule if k=n, the "OR" rule if k=1 and the majority rule if k=n/2.

In hard combining with side information, sensory nodes may send a DSM unit information in addition to the binary decision. The additional information, such as the sensory node's signal-to-noise ratio (SNR), the sensory node's detection probability and the sensory node's false alarm probability, may indicate the reliability of the sensing decision. This information may help the DSM unit to make a better overall decision as to whether the spectrum is in use by primary users. Corresponding information combining rules may include, for example, the selection rule, the switch-and-stay rule and the Chair-Varshney rule.

In soft combining, instead of sending a DSM unit binary decisions, sensory nodes may send the DSM unit some soft information, such as detected energy level and SNR. Corresponding information combining rules may include, for example, the equal-gain rule and the maximal-ratio rule.

The sensing controller 302 may be configured to control operations of the sensing processor 301. More specifically, the sensing controller 302 may receive a spectrum inquiry from the cognitive engine 304 and, in response to receiving the spectrum inquiry, initiate a sensing task by selecting sensory nodes to participate in the task and sending sensing task requests to selected sensory nodes, fusion helper nodes and relay nodes. The sensing task requests may request a sensory node to sense the spectrum and return the results either directly to the sensing processor 301 or via a fusion helper or relay node. The sensing task requests may also, or alternatively, request a fusion helper node to combine sensing results from certain sensory nodes using one or more selected combining schemes and return the results to the sensing processor 301. The sensing task requests may also, or alternatively, request a relay node to forward results from certain sensory nodes to the sensing processor 301. Sensing results received from fusion helper and relay nodes may be stored in the sensing results database 308. The sensing controller 302 may receive a notice from the information fusion unit 316 and, in response to receiving the notice, check the sensing results stored in the sensing results database 308 and send sensing results back to the cognitive engine 304.

When a node first joins the network, it may first register with the sensing controller 302. When the node is a fusion helper node or a relay node, the sensing controller 302 may send a request for sensing related information (e.g., a fusion helper configuration request for the combining capability information of the fusion helper node or a relay configuration request for the relaying capability information of the relay node). The returned combining or relaying capability information may then be processed at the capability registry unit 314 and stored in the fusion helper configuration database 310 or the relay configuration database 312. When a fusion helper or relay node has some changes of its condition, including exiting the sensing sub-network, the sensing controller 302 may update the fusion helper configuration database 310, the relay configuration database 312 and/or the sensing results database 308.

The sensing results database 308 may record historical sensing results for each spectrum inquiry from the cognitive engine 304, including, for example, any combining schemes used to carry out the task. The sensing results database 308 may also create matrix-formed databases for each registered fusion helper node and relay node, recording the combining and relaying histories of the fusion helper node and relay node. For dynamic nodes, the sensing results database 308 may record the performance of the dynamic node when acting as a relay and fusion helper node.

Table 1 illustrates an example sensing results database 308 for a fusion helper node. In Table 1, the first five columns ("sensory node columns") indicate the sensory nodes that are reachable from the fusion helper node. The second to last column may indicate the combining schemes used in a task and the last column may indicate correctness of the combining results for the task (for hard combining with or without side information in this example). Each row of the matrix may represent a task executed by the fusion helper node. It may contain the time (t), frequency (f) and location (x,y) information of the fusion helper. Each entry in the matrix for sensory nodes columns may record the location of the sensory node when performing the sensing. It may be empty when a sensory node does not participate in the task.

sensory nodes) reachable from each node. The fusion methods may include, for example, the "AND" rule, the "OR" rule, the majority rule, the maximum ratio rule and the equal gain rule. A list of fusion techniques may be in the enumeration data format or any other suitable format. Table 3A

TABLE 1

| | Sensor 1 | Sensor 2 | Sensor 3 | Sensor 4 | Sensor 5 | Combining scheme | Results |
|---|---|---|---|---|---|---|---|
| $(t_1, f_1, x_1, y_1)$ | (x, y) | | (x, y) | (x, y) | | Hard combining | Correct |
| $(t_2, f_2, x_2, y_2)$ | | (x, y) | (x, y) | | (x, y) | Hard combining | Correct |
| $(t_3, f_3, x_3, y_3)$ | | (x, y) | | | (x, y) | Hard combining with side information | Wrong |

Table 2 illustrates an example sensing results database 308 for a relay node. In Table 2, the first five columns indicate the sensory nodes that are reachable from the relay node. The second to last column may indicate the relaying schemes used in a task, and the last column may indicate the correctness of the relayed results for the task (for hard Decode-and-forward and Amplify-and-forward in this example). Each row of the matrix may represent a task executed by the relay node. It may contain the time, frequency and location information of the relay node. Each entry in the matrix for sensory nodes columns may record the location of the sensory node when performing the sensing. It may be empty when a sensory node does not participate in the task.

illustrates an example parameter (FusionMode) that indicates the information about the data fusion methods supported by the fusion helper node.

TABLE 3A

| Names: | FusionMode | Phys. Unit | | Extends: | |
|---|---|---|---|---|---|
| ID: | | Size: | Variable | Type: | Enumeration |
| Desc: | List of data fusion modes supported by the fusion helper | | | | |
| Enumerator | FusionMode.AND | Value | | | 0 |
| Enumerator | FusionMode.OR | Value | | | 1 |
| Enumerator | FusionMode.Majority | Value | | | 2 |

TABLE 2

| | Sensor 1 | Sensor 2 | Sensor 3 | Sensor 4 | Sensor 5 | Relaying scheme | Results |
|---|---|---|---|---|---|---|---|
| $(t_1, f_1, x_1, y_1)$ | (x, y) | | (x, y) | (x, y) | | Decode-and-forward | Correct |
| $(t_2, f_2, x_2, y_2)$ | | (x, y) | (x, y) | | (x, y) | Amplify-and-forward | Correct |
| $(t_3, f_3, x_3, y_3)$ | | (x, y) | | | (x, y) | Amplify-and-forward | Wrong |

The capability registry 314 may collect capability information from nodes in the sensing network 300, including the sensory nodes 318 and 320, the fusion helper nodes 322 and 324 and the relay nodes 325 and 327. Depending on the type of information collected, the capability registry 314 may store collected information in one of the sensory nodes configuration database 306, the fusion helper configuration database 310 and the relay configuration database 312. For example, the sensory nodes configuration database 306 may store sensing capability information from sensory nodes (e.g., sensory nodes 318 and 320), the fusion helper configuration database 310 may store combining capability information for each registered fusion helper node (e.g., fusion helper nodes 322 and 324) and the relay configuration database 312 may store relaying capability information for each registered relay node (e.g., relay nodes 325 and 327).

The combining capability information received from a node (e.g., a fusion helper node) may include, for example, information about data fusion methods supported by the fusion helper node and/or a list of at least one node (e.g., As illustrated in Table 3A, the FusionMode parameter may indicate the numbers and types of data fusion methods supported by the fusion helper node, for example, the "AND" rule (FusionMode.AND), the "OR" rule (FusionMode.OR) and the "majority" rule (FusionMode.Majority). A list of sensory nodes reachable from a given node may be in the string data format or any other suitable data format. Table 3B illustrates an example parameter (ReachableNodes) that indicates at least one other node that is reachable from the fusion helper node.

TABLE 3B

| Names: | ReachableNodes | Phys. Unit | | Extends: | |
|---|---|---|---|---|---|
| ID: | | Size: | Variable | Type: | Array (String) |
| Desc: | ID list of the sensors reachable from the fusion helper | | | | |
| .0 | ReachableNodes.Node1 | | Type: | | String |
| .1 | ReachableNodes.Node2 | | Type: | | String |

As illustrated in Table 3B, the ReachableNodes parameter may indicate numbers and identifiers (IDs) for the nodes (e.g., sensory nodes) reachable from a current fusion helper node. This parameter may facilitate the route design for a certain sensing task.

The relaying capability information received from a node (e.g., a relay node) may include, for example, information about the relaying methods supported by the relay node and/or a list of at least one node (e.g., sensory nodes) reachable from each node. The relaying methods may include, for example, the "Amplify-and-Forward" scheme and/or the "Decode-and-Forward" scheme. Table 4 illustrates an example parameter (RelayMode) that indicates the information about the relaying methods supported by the relay node.

TABLE 4

| Names: | RelayMode | Phys. Unit | | Extends: | |
|---|---|---|---|---|---|
| ID: | | Size: | Variable | Type: | Enumeration |
| Desc: | List of data relay modes supported by the relay | | | | |
| Enumerator | RelayMode.AF | Value | | | 0 |
| Enumerator | RelayMode.DF | Value | | | 1 |

As illustrated in Table 4, the RelayMode parameter may indicate the numbers and types of relaying methods supported by the relay node, for example, the "Amplify-and-Forward" scheme (RelayMode.AF) and the "Decode-and-Forward" scheme (RelayMode.DF). The list of sensory nodes reachable from a given node may be in the same formats as for a fusion helper node, which are described above.

The capability registry 314 may store combining capability information in the fusion helper configuration database 310 as a list of parameters for each registered fusion helper node. Such parameters may include, for example, a Location parameter, a Reachable Sensory Nodes parameter, a Supporting Combining Schemes parameter, a Latency parameter and a Transmission Power parameter. The Location parameter may indicate information about a location of a node (e.g., a fusion helper node). By way of example, the Location parameter may indicate a relative location of a fusion helper node to a DSM unit or may be an exact location. The Reachable Sensory Nodes parameter may indicate sensory nodes that a node (e.g., a fusion helper node) may hear from. The Supporting Combining Schemes parameter may indicate combining schemes that a node (e.g., a fusion helper node) may implement. The Latency parameter may indicate a delay that a node (e.g., a fusion helper node) may incur when implementing a combining task. The Supporting Combining Schemes and Latency parameters may help the sensing controller 302 determine whether a node is qualified for a sensing task. The Transmission Power parameter may indicate a transmission power of a node (e.g., a fusion helper node). The Transmission Power parameter may help the sensing controller 302 know the physical layer (PHY) feature of the fusion helper node. Table 5 illustrates an example data format for the fusion helper configuration database 310 including each of the Location, Reachable Sensory Nodes, Supporting Combining Schemes, Latency and Transmission Power parameters.

TABLE 5

| | Location | Reachable Sensory Nodes | Supporting Combining Schemes | Latency | Transmission Power |
|---|---|---|---|---|---|
| Fusion Helper 1 | (1 m, 3 m) | 1, 3, 4, 5, 8 | Hard combining, Hard combining with side information | <800 ms | 4 dBm |
| Fusion Helper 2 | (4 m, −20 m) | 2, 7 | Hard combining | <1 s | −5 dBm |

The capability registry 314 may store relaying capability information in the relay configuration database 312 as a list of parameters for each registered relay node. Such parameters may include, for example, a Location parameter, a Reachable Sensory Nodes parameter, a Supporting Relaying Schemes parameter, a Latency parameter and a Transmission Power parameter. The Location parameter may indicate information about a location of a node (e.g., a relay node). By way of example, the Location parameter may indicate a relative location of a relay node to a DSM unit or may be an exact location. The Reachable Sensory Nodes parameter may indicate sensory nodes that a node (e.g., a relay node) may hear from. The Supporting Relaying Schemes parameter may indicate relaying schemes that a node (e.g., a relay node) may implement. The Latency parameter may indicate a delay that a node (e.g., a relay node) may incur when implementing a relaying task. The Supporting Relaying Schemes and Latency parameters may help the sensing controller 302 determine whether a node (e.g., a relay node) is qualified for a sensing task (e.g., a relaying task). The Transmission Power parameter may indicate a transmission power of a node (e.g., a relay node). The Transmission Power parameter may help the sensing controller 302 know the PHY feature of the relay node. Table 6 illustrates an example data format for the relay configuration database 312 including each of the Location, Reachable Sensory Nodes, Supporting Relaying Schemes, Latency and Transmission Power parameters.

TABLE 6

| | Location | Reachable Sensory Nodes | Supporting Relaying Schemes | Latency | Transmission Power |
|---|---|---|---|---|---|
| Relay 1 | (1 m, 3 m) | 1, 3, 4, 5, 8 | Amplify-and-forward | <800 ms | −4 dBm |
| Relay 2 | (4 m, −20 m) | 2, 7 | Decode-and-forward | <1 s | −3 dBm |

The capability registry 314 may store sensing capability information in the sensory nodes configuration database 306 as a list of parameters for each registered sensory node. Such parameters may include parameters related to a sensing function of the sensory node, for example, a Working Spectrum parameter, a Location parameter, an RF Device Sensitivity parameter, a Computational Capability parameter, a Supporting Sensing Schemes parameter, a Latency Condition parameter and a Transmission Power parameter. For dynamic nodes, the parameters may also include, for example, a Relaying Capability parameter, a Combining Capability parameter and a Reachable Sensory Nodes parameter. The Relaying Capability parameter may indicate whether a sensory node is capable of acting as a relay node, what relaying schemes (if any) the sensory node is capable of implementing and any other information related to relaying parameters (e.g., described above). The Combining Capability parameter may indicate whether a sensory node is capable of acting as a fusion helper node, what types of combining operations the sensory node is capable of implementing and any other information related to fusion helper parameters (e.g., described above). The Reachable Sensory Nodes parameter may indicate which nodes a particular sensory node may perform relaying and/or fusion services for. Table 7 illustrates an example data format for the sensory nodes configuration database 306 including each of the Working Spectrum, Location, RF Device Sensitivity, Computational Capability, Supporting Sensing Schemes, Latency, Transmission Power, Relaying Capability, Combining Capability and Reachable Nodes parameters.

in one or more of the sensory nodes configuration database 306, the fusion helper configuration database 310 and the relay configuration database 312). In step 506, the DSM unit may select one or more of the nodes to perform a sensing task based at least on the sensing related information received from the nodes. The sensing task may include, for example, one or more of combining sensing results from sensory nodes, forwarding the sensing results from at least one sensory node and RF spectrum sensing. In step 508, the DSM unit may send a request to perform the sensing task to the selected one or more of the nodes.

Figure 6:
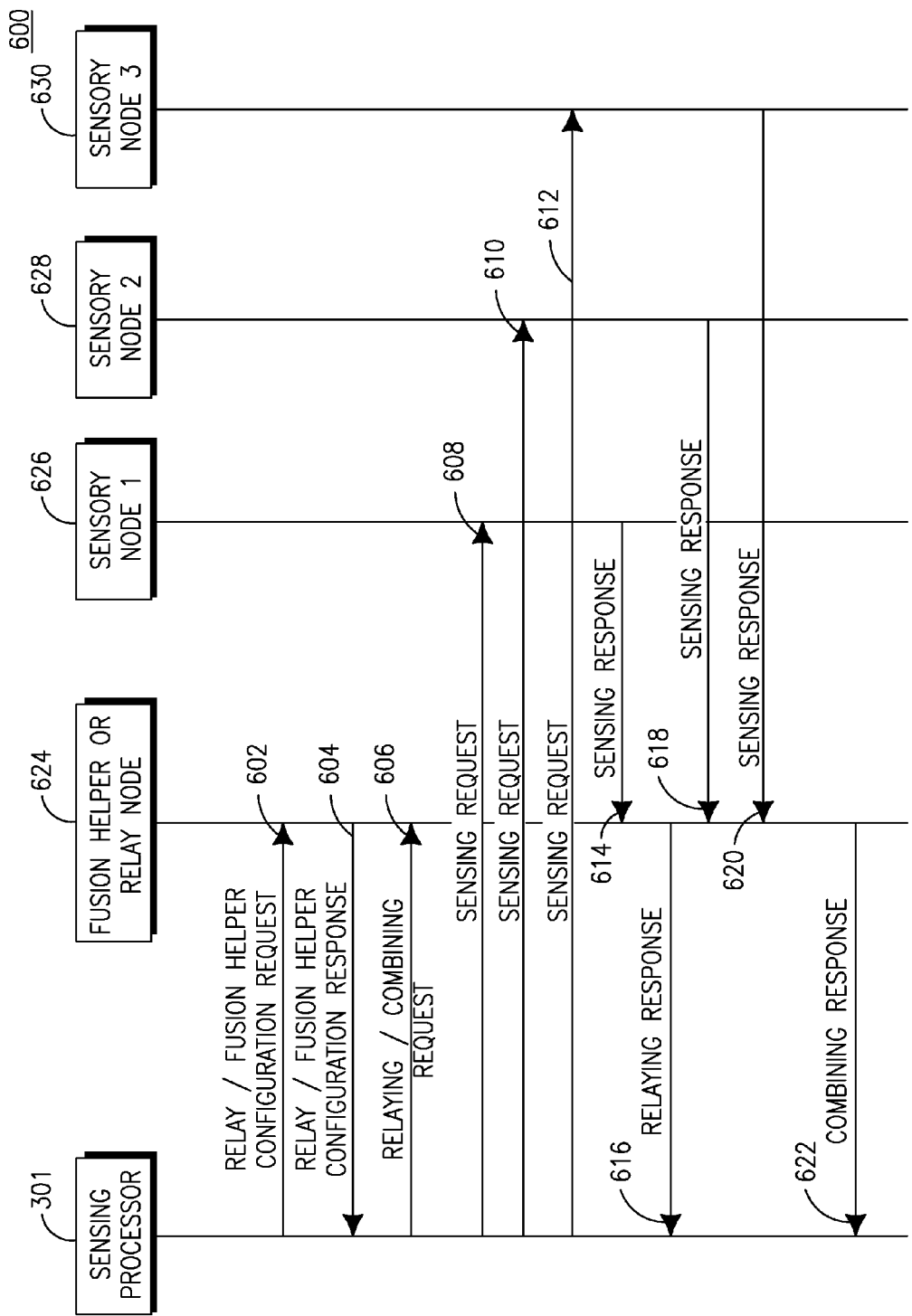
FIG. 6 is a signal diagram illustrating example call flows of a sensing processor for an example RF sensing network with one or both of static fusion helper nodes and static relay nodes.

FIG. 6 is a signal diagram 600 illustrating example call flows of a sensing processor (e.g., the sensing processor 301) for an example RF spectrum sensing network with one or both of static fusion helper nodes and static relay nodes. In the illustrated signal diagram, the sensing processor 301 may send one or more of a fusion helper request message and a relay configuration request message (Relay/Fusion

TABLE 7

| | Working Spectrum | Location | RF Device Sensitivity | Computational Capability | Supporting Sensing Schemes | Latency | Transmission Power | Relaying Capability | Combining Capability | Reachable Nodes |
|---|---|---|---|---|---|---|---|---|---|---|
| Sensory node 1 | 100 MHz~1 GHz | (1 m, 3 m) | −85 dBm | $2^{nd}$ class | Energy detection | <800 ms | 3 dBm | AF, DF | Hard Combining | 2, 4, 5 |
| Sensory node 2 | 50 MHz~300 GHz | (4 m, 8 m) | −70 dBm | $3^{rd}$ class | Covariance-based | <1 s | −5 dBm | AF | Hard Combining | 1, 4 |

Figure 4:
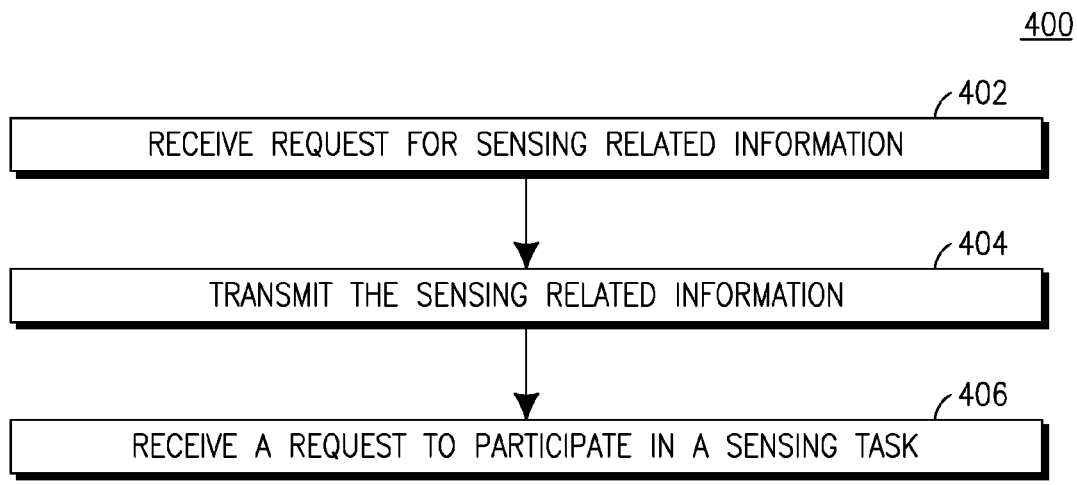
FIG. 4 is a flow diagram of an example method of DSM.
Figure 5:
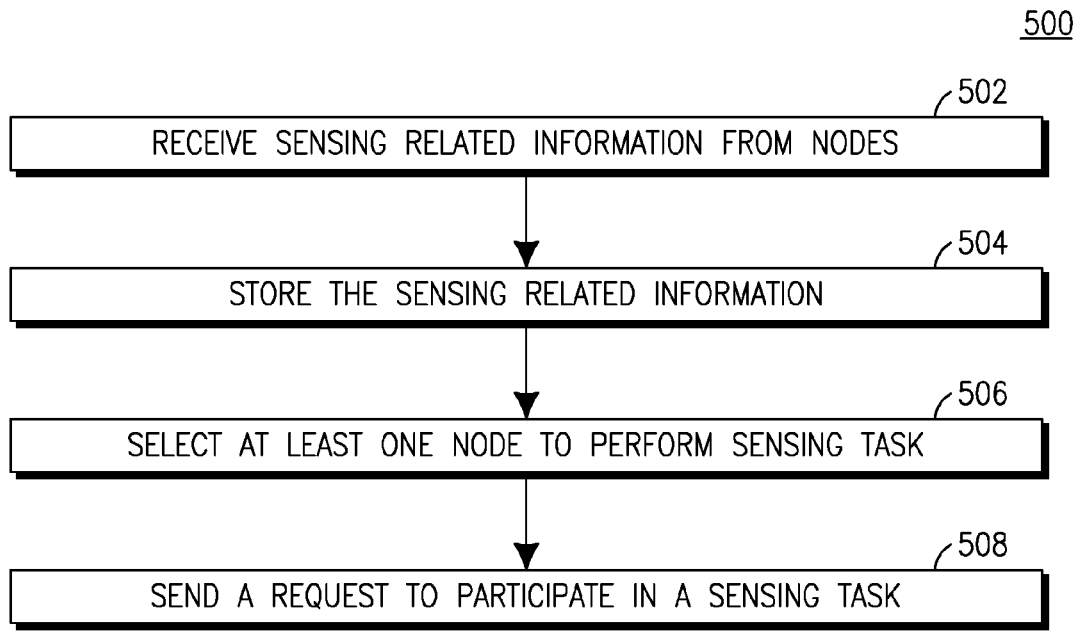
FIG. 5 is a flow diagram of another example method of DSM.

FIGS. 4 and 5 are flow diagrams of example methods of DSM that may pertain to collecting capability information.

FIG. 4 is a flow diagram 400 of an example method of DSM, which may be implemented in, for example, a node, such as a fusion helper node, a relay node or a dynamic sensory node. In step 402, the node may receive a request for sensing related information. The sensing related information may include, for example, information about one or more of data fusion methods supported by the node (e.g., Supporting Combining Schemes or Combining Capability), one or more relaying methods supported by the node (e.g., Supporting Relaying Schemes or Relaying Capability) and information about at least one other node that is reachable from the node (e.g., Reachable Nodes). In step 404, in response to receiving the request, the node may transmit the sensing related information (e.g., to the sensing processor 301). In step 406, the node may receive a request to participate in a sensing task based on the transmitted sensing related information. The sensing task may include, for example, one or more of combining sensing results from sensory nodes, forwarding the sensing results from at least one sensory node and RF spectrum sensing.

FIG. 5 is a flow diagram 500 of an example method of DSM, which may be implemented in, for example, a DSM unit (e.g., DSM unit 152 of FIG. 1D or 202 of FIG. 2). In step 502, the DSM unit may receive sensing related information from nodes (e.g., fusion helper nodes, relay nodes or dynamic sensory nodes). The sensing related information may include, for example, information about one or more data fusion methods supported by the nodes (e.g., Supporting Combining Schemes or Combining Capability), relaying methods supported by the nodes (e.g., Supporting Relaying Schemes or Relaying Capability) and at least one other node that is reachable from the nodes (e.g., Reachable Nodes). In step 504, the DSM unit may store the sensing related information in a memory of the DSM unit (e.g., the capability registry 314 may store the sensing related information Helper Configuration Request Message) 602 to a registered fusion helper node 624 and the capability registry unit 314 (signal to the capability registry unit not shown). Upon receiving s fusion helper request message 602, s fusion helper node 624 may send a fusion helper configuration response message 604, including its combining capability information, to the capability registry unit 314 of the sensing processor. 301 Similarly, upon receiving a relay configuration request message 602, a relay node 624 may send a relay configuration response message 604, including its combining capability information, to the capability registry unit 314 of the sensing processor 301. The capability registry unit 314 may perform processing on the received information and then store the information in the appropriate database (e.g., the fusion helper configuration database 310 or the relay configuration database 312).

Based on the information provided in the relay/fusion helper configuration response message 604, the sensing processor 301 may select one or more relay and/or fusion helper nodes to participate in a sensing task. The sensing processor 301 may send a relaying request message and/or a combining request message (Relaying/Combining Request Message) 606 to the selected relay and/or fusion helper nodes (represented by the fusion helper or relay node 624 in FIG. 6). The message may request selected fusion helper nodes to perform certain combining operations on sensing results provided by certain sensory nodes or certain relay nodes to perform certain relaying operations on sensing results provided by certain sensory nodes.

A combining request message 606 may include information about one or more fusion techniques to be used for the sensing task and a list of sensory nodes whose sensing results are to be fused. Table 8 illustrates an example of how such information may be covered. The FusionMode parameter may indicate the number and type of data fusion methods that the fusion helper node receiving the message is to apply.

TABLE 8

| Names: | FusionMode | Phys. Unit | | Extends: | |
|---|---|---|---|---|---|
| ID: | | Size: | Variable | Type: | Enumeration |
| Desc: | List of data fusion modes to be performed in a specific combining task | | | | |
| Enumerator | FusionMode.AND | Value | | | 0 |
| Enumerator | FusionMode.OR | Value | | | 1 |
| Enumerator | FusionMode.Majority | Value | | | 2 |

A relaying request message 606 may include information about one or more relaying techniques to be used for the sensing task and a list of sensory nodes whose sensing results are to be relayed. Table 9 illustrates an example of how such information may be covered. The RelayMode parameter may indicate the number and type of relaying methods that the relay node receiving the message is to apply.

TABLE 9

| Names: | RelayMode | Phys. Unit | | Extends: | |
|---|---|---|---|---|---|
| ID: | | Size: | Variable | Type: | Enumeration |
| Desc: | List of relaying modes to be performed in a specific relaying task | | | | |
| Enumerator | RelayMode.AF | Value | | | 0 |
| Enumerator | RelayMode.DF | Value | | | 1 |

The sensing processor may also send sensing request messages 608, 610 and 612 to sensory nodes 626, 628 and 630. The messages may request the sensory nodes 626, 628 and 630 to perform certain sensing operations and to send the results to the sensing processor 301, a certain fusion helper node or a certain relay node (both of which are represented by the fusion helper or relay node 624 in FIG. 6). The sensory nodes 626, 628 and 630 may perform the requested sensing operations and send the results to the indicated sensing processor 301, fusion helper node or relay node 624. In the example illustrated in the signal diagram 600, the sensory node 626 sends a sensing response message 614 to a fusion helper node 624, the sensory node 628 sends a sensing response message 618 to a relay node 624 and the sensory node 630 sends a sensing response message 620 to a fusion helper node 624. The fusion helper node 624 sends a combining response message 622 to the sensing processor 301. The combining response message 622 may include information about the one or more fusion techniques used in the task and a list of sensory nodes whose sensing results are combined. The relay node 624 sends a relaying response message 616 to the sensing processor 301. The relaying response message 616 may include information about the one or more relaying techniques used in the task and a list of sensory nodes whose sensing results are relayed. Other contents of the relaying response message 616 may depend on the sensing technique(s) used. For example, if a hard combining scheme is used, the message may just include a 1 bit decision. If a soft combining scheme is used, the message may include the soft sensing information.

Figure 7:
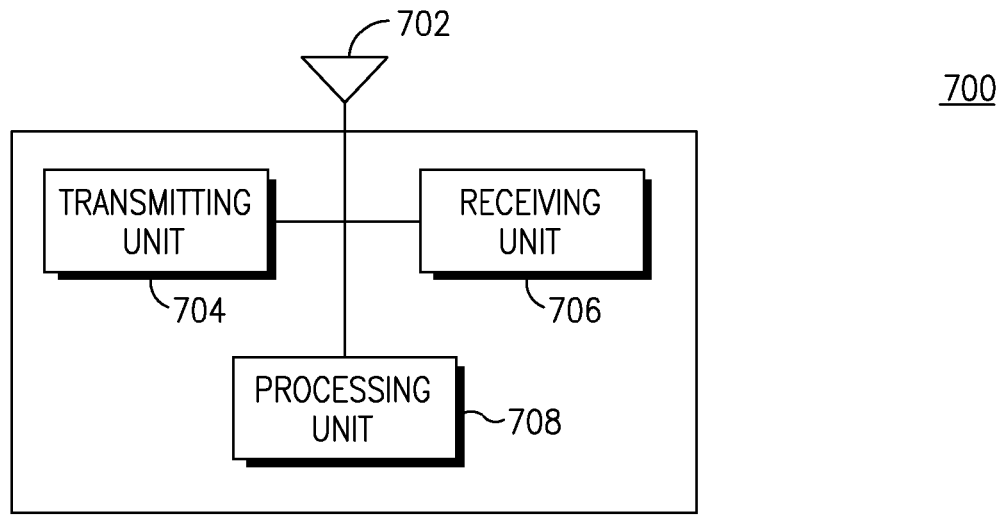
FIG. 7 is a block diagram of an example node.

FIGS. 7, 8, 9 and 10 illustrate example nodes. While only some elements of the nodes are illustrated in FIGS. 7, 8, 9 and 10, one of ordinary skill in the art will recognize that the nodes may include other features (e.g., associated input/output (I/O) ports and/or graphic user interfaces (GUIs) that are not shown. FIG. 7 is a block diagram of an example relay node 700. The illustrated relay node 700 includes an antenna 702, a transmitting unit 704, a receiving unit 706 and a processing unit 708. In operation, the relay node 700 may receive a sensing task request from a DSM unit and sensing results from other nodes via the antenna 702 and the receiving unit 706, process the received sensing results as needed in the processing unit 708 and transmit the received and potentially processed sensing results to a DSM unit via the transmitting unit 704 and the antenna 702.

Figure 8:
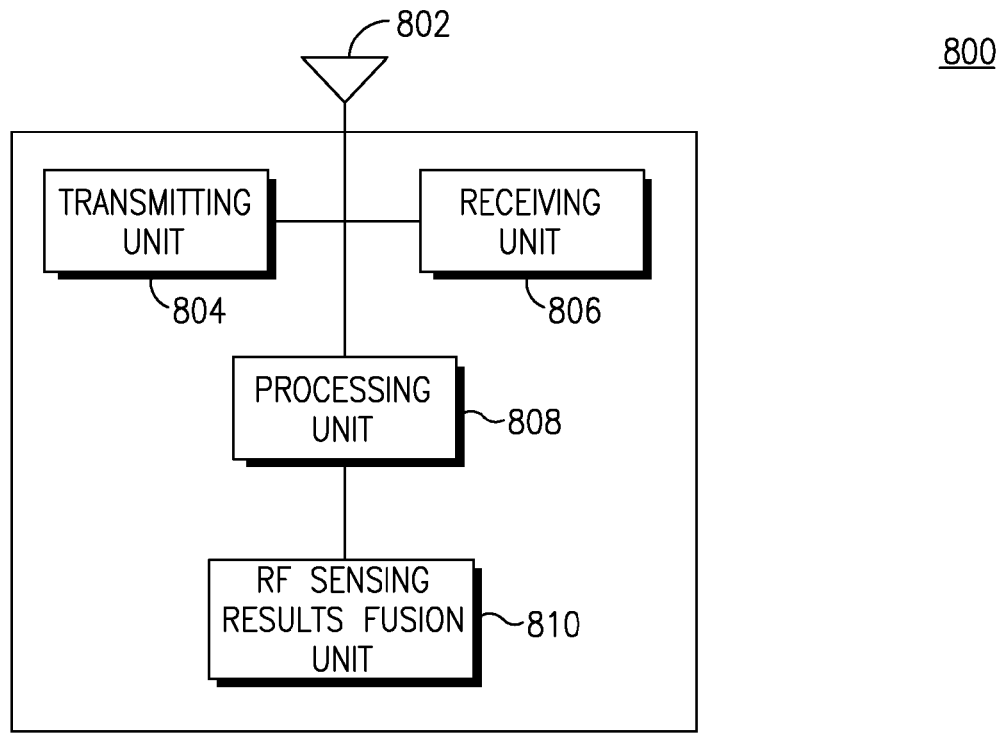
FIG. 8 is a block diagram of another example node.

FIG. 8 is a block diagram of a node 800. The node 800 may be either a static fusion helper node or a dynamic node capable of acting as a fusion helper and relay node. The illustrated node 800 includes an antenna 802, a transmitting unit 804, a receiving unit 806, a processing unit 808 and an RF sensing results fusion unit 810. In operation, the node 800 may receive a sensing task request from a DSM unit and sensing results from other nodes via the antenna 802 and the receiving unit 806, process the receiving sensing results as needed in the processing unit 808, perform requested fusion techniques in the RF sensing results fusion unit 802 and transmit the received and potentially processed and/or fused sensing results to a DSM unit via the transmitting unit 804 and the antenna 802.

Figure 9:
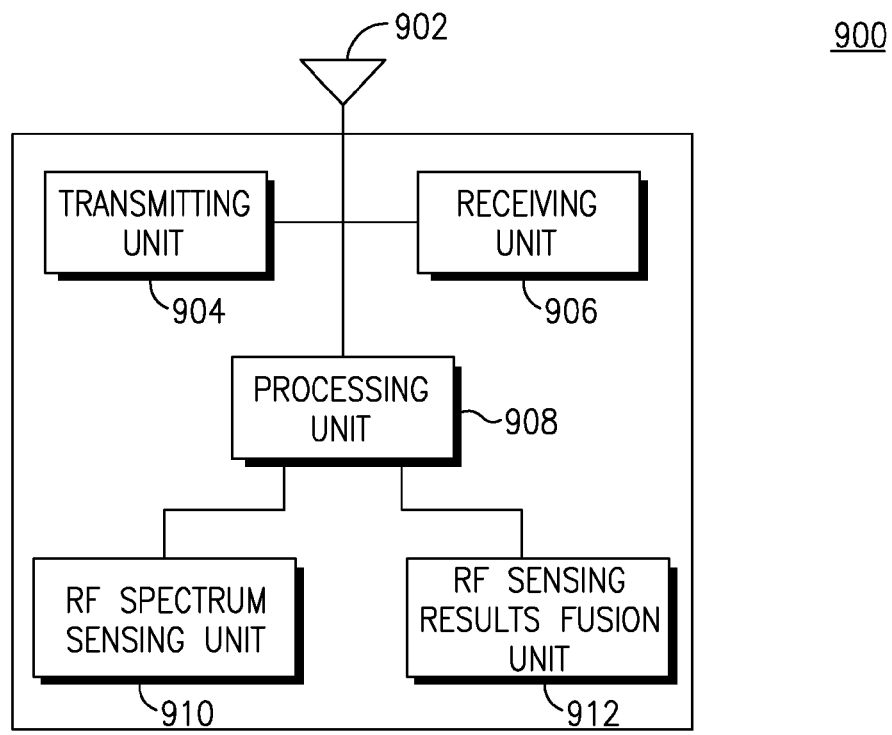
FIG. 9 is a block diagram of another example node.

FIG. 9 is a block diagram of a dynamic sensory node 900 (e.g., an RF spectrum sensor). The illustrated node 900 includes an antenna 902, a transmitting unit 904, a receiving unit 906, a processing unit 908, an RF spectrum sensing unit 910 and an RF sensing results fusion unit 912. Because the node 900 is a dynamic sensory node, the node 900 is capable of acting as a sensory node, a relay node and a fusion helper node (e.g., it is configured to measure information indicative of spectrum occupancy, to perform at least one of combining spectrum sensing results from itself and at least one other RF spectrum sensor and forward the spectrum sensing results for the at least one other RF spectrum sensor). The node 900 may be configured to receive a sensing task request via the antenna 902 and the receiving unit 906, sense the spectrum using the RF spectrum sensing unit 910, process the results of the spectrum sensing using the processing unit 908 as needed and transmit the sensing results to a DSM unit via the transmitting unit 904 and the antenna 902. The node 900 may also be configured to receive a relaying task request from a DSM unit and sensing results from other nodes via the antenna 902 and the receiving unit 906, process the received sensing results as needed in the processing unit 908 and transmit the received and potentially processed sensing results to a DSM unit via the transmitting unit 904 and the antenna 902. The node 900 may also be configured to receive a fusion task request from a DSM unit and sensing results from other nodes via the antenna 902 and the receiving unit 906, process the received sensing results as needed in the processing unit 908, perform requested fusion techniques in the RF sensing results fusion unit 912 and transmit the fused sensing results to a DSM unit via the transmitting unit 904 and the antenna 902. Because the node 900 is capable of acting as a sensory node, the node 900 may also fuse its own sensing results with sensing results received from other nodes.

Figure 10:
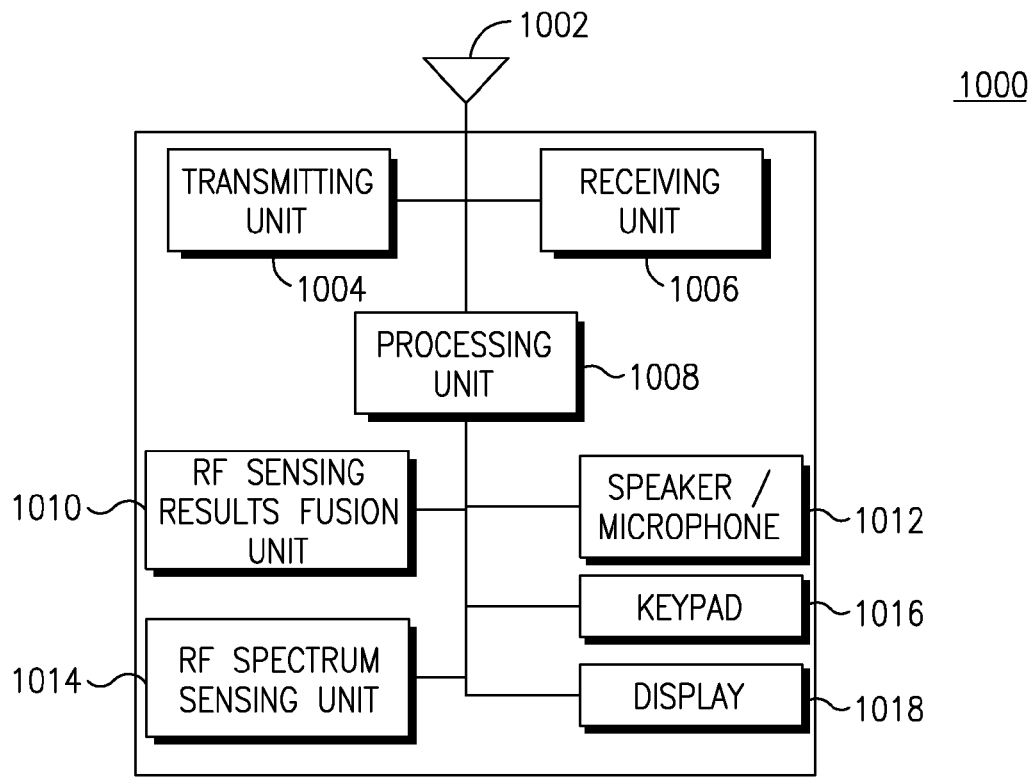
FIG. 10 is a block diagram of another example node.

FIG. 10 is a block diagram of a wireless transmit/receive unit (WTRU) 1000. The WTRU 1000 may be any type of device configured to operate and/or communicate in a wireless environment. By way of example, the WTRU 1000 may be configured to transmit and/or receive wireless signals and may be user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The illustrated WTRU 1000 includes an antenna 1002, a transmitting unit 1004, a receiving unit 1006, a processing unit 1008, an RF sensing results fusion unit 1010, a speaker/microphone 1012, an RF spectrum sensing unit 1014, a keypad 1016 and a display unit 1018. In addition to the capabilities described in the previous paragraph, the WTRU 1000 may also be configured to act as a dynamic node as described with respect to FIG. 9. By way of example, the WTRU 1000 may be a secondary spectrum user. Here, the secondary spectrum user may want to use the spectrum and may sense the spectrum itself and transmit its sensing results to a DSM unit. It may also act as a relay node and/or a fusion helper node for sensing results received from other sensory nodes.

Figure 11:
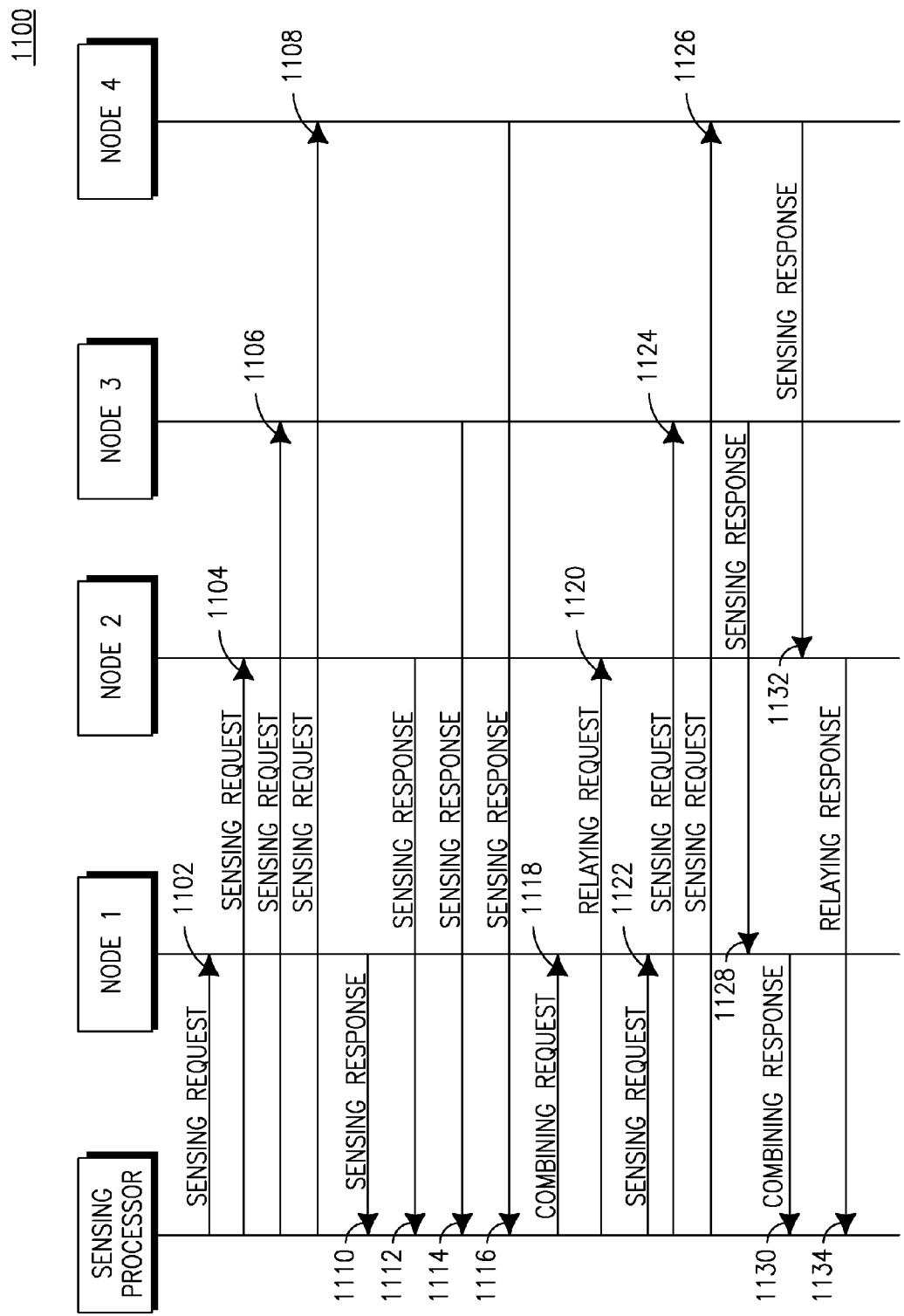
FIG. 11 is a signal diagram illustrating example call flows of a sensing processor for an example RF sensing network with dynamic nodes.

FIG. 11 is a signal diagram illustrating example call flows of a sensing processor for an example sensor network with dynamic nodes. In an illustrated example, the sensing processor sends sensing request messages 1102, 1104, 1106 and 1108 to each of the nodes 1, 2, 3 and 4. Each node may send a sensing response message 1110, 1112, 1114 and 1116, respectively, to the sensing processor, potentially creating a bottle neck at the sensing processor. In an alternative example, the sensing processor may decide to let the node 1 act as a fusion helper node to combine sensing results from nodes 1 and 3 and let the node 2 discontinue sensing but act as a relay node for sensing results from node 4. Thus, the sensing processor may send sensing request messages 1122, 1124 and 1126 to nodes 1, 3 and 4, respectively, and combining and relaying requests 1118 and 1120 to nodes 1 and 2, respectively. Upon receiving a sensing response message 1128 from the node 3, the node 1 may combine its own sensing results with the sensing results from the node 3 and send the combined sensing results as a combining response message 1130 to the sensing processor. Further, upon receiving a sensing response message 1132 from the node 4, the node 2 may forward the sensing response message as a relaying response message 1134 to the sensing processor. Thus, in this example, the sensing processor only receives two response messages, including the sensing results from more than two nodes.

A sensing controller (e.g., the sensing controller 302 illustrated in FIG. 3) may decide to let certain dynamic nodes act as fusion helper or relay nodes based on at least one trigger, which may include communication bottleneck, transmission power limitation, correlated sensing results and frequent transmission error triggers. With respect to the communication bottleneck trigger, if the number of sensory nodes for a sensing task is large, then the sensing processor may receive many sensing response messages from sensory nodes. To relieve the communication traffic, the sensing processor (e.g., the sensing processor 301 illustrated in FIG. 3) may request certain dynamic nodes to act as fusion helper nodes. With respect to the transmission power limitation trigger, if some sensory nodes are low powered devices and/or the distance from the sensory nodes to the sensing processor is long, the sensing response messages from these nodes may not reach the sensing processor. Here, the sensing processor may assign certain dynamic nodes to act as fusion helper or relay nodes. With respect to the correlated sensing results trigger, if some sensory nodes are close together and their sensing results are also highly correlated with one another, then these sensory nodes may be considered as a cluster. Here, the sensing processor may assign a cluster head to collect all the sensing results information within the cluster and report the overall sensing results for the cluster. The cluster head may be a dynamic node acting as either a fusion helper node or a relay node. With respect to frequent transmission error, if sensing results from some sensory nodes are frequently incorrect, the sensing processor may consider that the sensory nodes experience bad fusion channel conditions. In other words, the sensing results from those sensory nodes may not be delivered correctly. Hence, the sensing controller may find one or more nearby dynamic nodes to act as relay and/or fusion helper nodes.

The selection of relay and fusion helper nodes may be executed at the sensing controller (e.g., the sensing controller 302 illustrated in FIG. 3). To be selected to act as a fusion helper or relay node, the node must have such capability. The capability information may be stored in the sensory node configuration database. The selection criteria may include one or more of location-based conditions, sensing results-based conditions, performance-based conditions and capability-based conditions.

With respect to location-based conditions, if a sensory node needs the relaying or combining service, the sensing controller may try to find a sensory node located between the sensory node and the sensing processor. The location of the relay and fusion helper nodes may be important as it may affect overall performance. Further, as described above, a sensory node in a cluster may be selected as the fusion helper or relay node. In general, the cluster may be formed based on the locations of the component sensory nodes.

With respect to sensing results-based conditions, if some sensory nodes often have highly correlated sensing results, one of the nodes may be selected to act as a fusion helper node because it may be relatively easy to combine their sensing results.

With respect to performance-based conditions, if some sensory nodes historically perform well when acting as relay or fusion helper nodes, these sensory nodes will have more chance at being selected as relay or fusion helper nodes. The performance information may be stored in the sensing results database.

With respect to capability-based conditions, if some sensory nodes have more computational capability, higher transmission power limitations, lower latency, or other advantages, then these sensory nodes may be more likely to be selected to act as relay or fusion helper nodes. These capabilities may facilitate the relaying and fusion operations and may improve overall performance.

The RF spectrum sensing networks described above have included all static relay nodes, all static fusion helper nodes or all dynamic nodes. However, other networks may be possible that include combinations of these different types of nodes. Examples of such networks are described below with respect to FIGS. 12 and 13.

Figure 12:
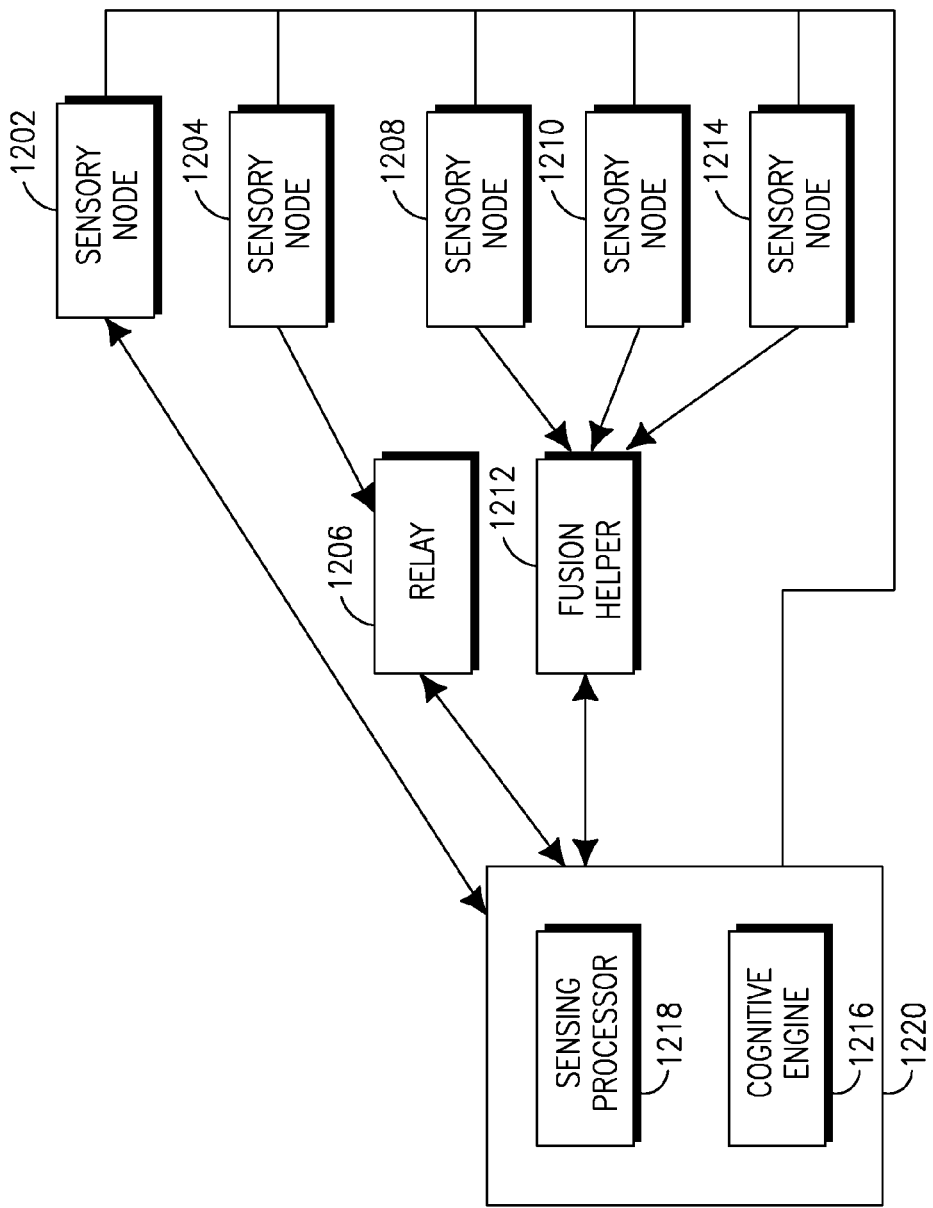
FIG. 12 is a block diagram of an example RF sensing network with relay nodes and fusion helper nodes in a hybrid mode.

FIG. 12 is a block diagram of an example RF sensing network 1200 with relay nodes and fusion helper nodes in a hybrid mode. The illustrated network includes a DSM unit 1220, sensory nodes 1202, 1204, 1208, 1210 and 1214, relay node 1206 and fusion helper node 1212. The illustrated DSM unit 1220 includes a sensing processor 1218 and a cognitive engine 1216.

In the illustrated network 1200, the sensing processor 1218 may send sensing request messages to all of sensory nodes 1202, 1204, 1208, 1210 and 1214. In the sensing request messages, the sensing processor 1218 may inform the sensory node 1202 to send its sensing results back to the sensing processor directly, inform the sensory node 1204 to send its sensing results to the relay node 1206 and inform the sensory nodes 1208, 1210 and 1214 to send their sensing results to the fusion helper node 1212. The relay node 1206 may forward the sensing results received from the sensory node 1204 to the sensing processor 1218, and the fusion helper node 1212 may send combined sensing results from the sensory nodes 1208, 1210 and 1214 to the sensing processor. In this example, the nodes 1206 and 1212 are static relay and fusion helper nodes, respectively, but either node may be a dynamic node that may act as a fusion helper or relay node. Further, one node may take the place of separate nodes 1206 and 1212 and act as fusion helper and relay nodes simultaneously. This one node may relay some sensing results to the sensing processor while combining other sensing results and sending the combined sensing results to the sensing processor.

Figure 13:
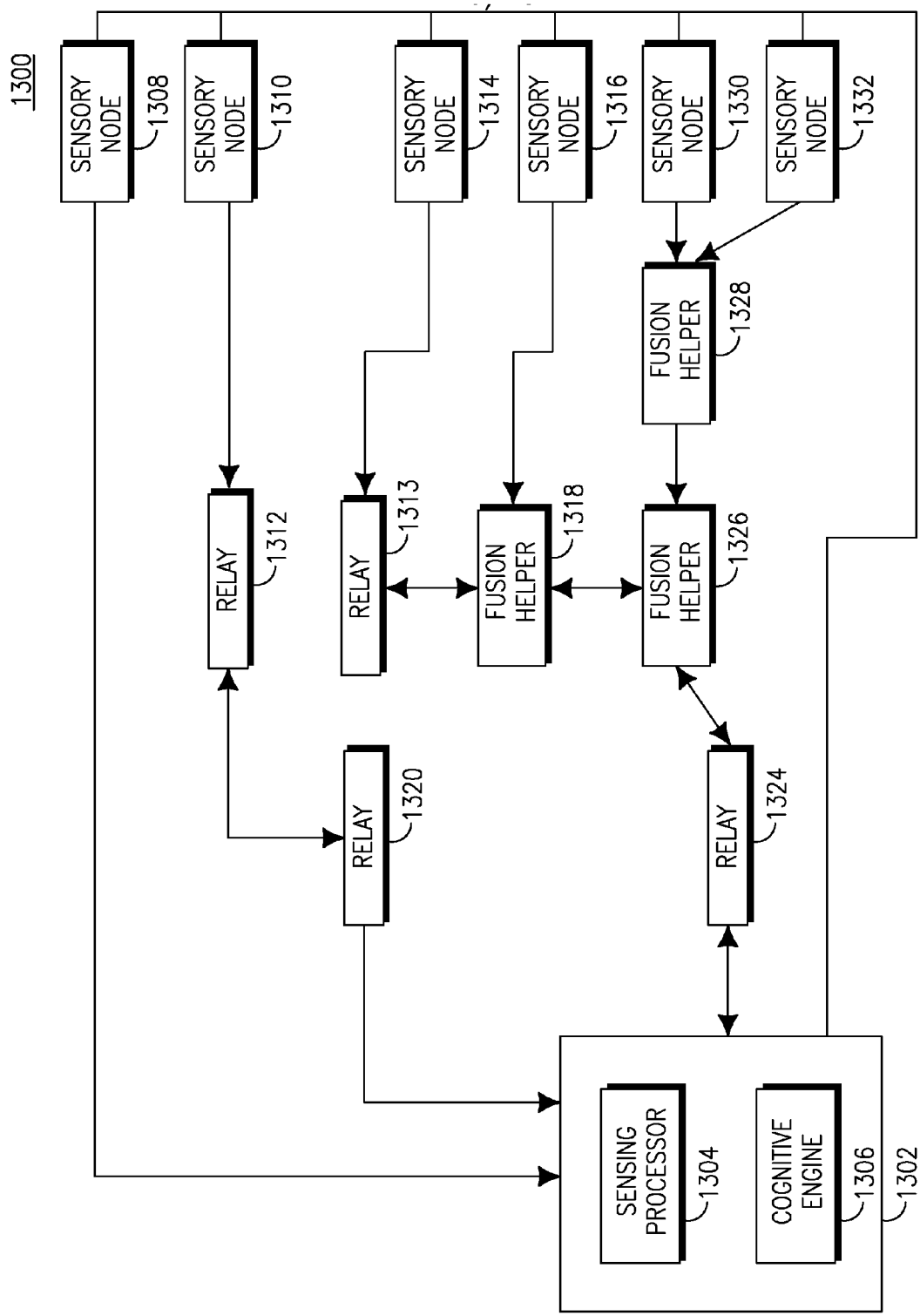
FIG. 13 is a block diagram of an example RF sensing network with multi-hop relay nodes and fusion helper nodes in a hybrid mode.

FIG. 13 is a block diagram of an example sensor network 1300 with multi-hop relay and fusion helper nodes in a hybrid mode. For example, relay nodes may forward sensing results to other fusion helper nodes or other relay nodes and fusion helper nodes may combine sensing results received from relay nodes or other fusion helper nodes. The illustrated RF spectrum sensing network 1300 includes a DSM unit 1302, six sensory nodes 1308, 1310, 1314, 1316, 1330 and 1332, four relay nodes 1312, 1313, 1320 and 1324 and three fusion helper nodes 1318, 1326 and 1328. The illustrated DSM unit 1302 includes a sensing processor 1304 and a cognitive engine 1306. The multi-hop relationships among the various sensory nodes, relay nodes and fusion helper nodes are illustrated in FIG. 13 by the arrows.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   a fusion helper node receiving a plurality of first sensing response messages via a plurality of first wireless fusion channels, wherein each of the plurality of first sensing response messages comprises first sensing related information;
   the fusion helper node receiving a request for combined sensing related information from a data fusion center, wherein the request for combined sensing related information comprises a parameter indicating a data fusion method to be used to combine the first sensing related information;
   in response to receiving the request for the combined sensing related information, the fusion helper node generating the combined sensing related information based on the first sensing related information using the data fusion method;
   the fusion helper node transmitting the combined sensing related information to the data fusion center, the combined sensing related information comprising the parameter indicating the data fusion method used by the fusion helper node to generate the combined sensing related information;
   the fusion helper node receiving at least one second sensing response message via at least one second wireless fusion channel, wherein the at least one second sensing response message comprises second sensing related information;
   the fusion helper node receiving a request for the second sensing related information from the data fusion center; and
   in response to receiving the request for the second sensing related information, the fusion helper node relaying the second sensing related information to the data fusion center.

2. The method of claim 1, wherein the parameter indicates that an AND data fusion method was used by the fusion helper node to generate the combined sensing related information.

3. The method of claim 1, wherein the combined sensing related information further comprises an indication of at least one relaying method supported by the fusion helper node.

4. The method of claim 1, wherein the combined sensing related information further comprises an indication of at least one of a number of nodes that are reachable from the fusion helper node and an identifier for the at least one of the nodes that is reachable from the fusion helper node.

5. The method of claim 1, wherein the data fusion method comprises one of a hard combining technique, a hard combining with side information technique, or a soft combining technique.

6. The method of claim 1, further comprising the fusion helper node receiving a request to participate in a sensing task from the data fusion center.

7. The method of claim 6, wherein the sensing task includes at least one of combining sensing results from RF spectrum sensory nodes, forwarding the sensing results from at least one RF spectrum sensory node, or RF spectrum sensing.

8. A fusion helper node comprising:
   a receiving unit configured to:
      receive a plurality of first sensing response messages via a plurality of first wireless fusion channels, wherein each of the plurality of first sensing response messages comprises sensing related information,
      receive a request for combined sensing related information from a data fusion center, wherein the request for combined sensing related information comprises a parameter indicating a data fusion method to be used to combine the first sensing related information,
      receive at least one second sensing response message via at least one second wireless fusion channel, wherein the at least one second sensing response message comprises second sensing related information, and
      receive a request for the second sensing related information from the data fusion center;
   a processing unit configured to generate the combined sensing related information based on the first sensing related information using the data fusion method; and
   a transmitting unit configured to:
      transmit the combined sensing related information to the data fusion center, the combined sensing related information comprising the parameter indicating the data fusion method used by the fusion helper node to generate the combined sensing related information, and relay the second sensing related information to the data fusion center.

9. The fusion helper node of claim 8, wherein the fusion helper node is configured to operate in a radio frequency (RF) spectrum sensing network.

10. The fusion helper node of claim 8, wherein the fusion helper node is a wireless transmit/receive unit (WTRU).

11. The fusion helper node of claim 8, wherein the fusion helper node is an RF spectrum sensor configured to measure information indicative of spectrum occupancy.

12. The fusion helper node of claim 11, wherein the RF spectrum sensor is a dynamic RF spectrum sensor configured to:

combine spectrum sensing results from at least one other RF spectrum sensor with spectrum sensing results obtained by the dynamic RF spectrum sensor to generate combined spectrum sensing results, and transmit the combined spectrum sensing results.

13. The fusion helper node of claim 8, wherein the processing unit configured to generate the combined sensing related information comprises the processing unit configured to combine spectrum sensing results from at least one of:

at least two RF spectrum sensory nodes, at least one RF spectrum sensory node and the fusion helper node, at least one other fusion helper node and the fusion helper node, the at least one other fusion helper node and at least one RF spectrum sensory node, at least one other relay node and the fusion helper node, or the at least one other relay node and the at least one RF spectrum sensory node.

14. The fusion helper node of claim 8, wherein the fusion helper node is a relay node, and wherein the transmitting unit is further configured to relay spectrum sensing results from at least one of:

at least one RF spectrum sensory node, at least one other relay node, or at least one fusion helper node.

15. A method comprising:

a dynamic spectrum management (DSM) unit transmitting a plurality of first sensing response requests to a plurality of first sensory nodes via a plurality of first wireless fusion channels;

the DSM unit transmitting a request for combined sensing related information to a fusion helper node, wherein the request for combined sensing related information comprises a parameter indicating a data fusion method to be used to combine sensing related information;

the DSM unit receiving the combined sensing related information from the fusion helper node, the combined sensing related information comprising first information indicative of a plurality of first sensing response messages received at the fusion helper node from the plurality of first sensory nodes and the parameter indicating the data fusion method used by the fusion helper node to generate the combined sensing related information;

the DSM unit transmitting at least one second sensing response request to at least one second sensory node via at least one second wireless fusion channel;

the DSM unit transmitting at least one request for relayed sensing related information to the fusion helper node;

the DSM unit receiving the relayed sensing related information from the fusion helper node, the relayed sensing related information comprising second information relayed by the fusion helper node from the at least one second sensory node; and the DSM unit storing the combined sensing related information and the relayed sensing related information in a memory of the DSM unit.

16. The method of claim 15, wherein the parameter indicates that an AND data fusion method was used by the fusion helper node to generate the combined sensing related information.

17. The method of claim 15, wherein each of the plurality of first sensing response requests comprises a request to perform at least one of combining sensing results from RF spectrum sensory nodes, forwarding sensing results from at least one RF spectrum sensory node, or RF spectrum sensing.

18. The method of claim 15, wherein the parameter indicating the data fusion method used by the fusion helper node comprises a data fusion method type indicator and a data fusion method number indicator.

19. The method of claim 15, wherein each of the plurality of first sensing response requests comprises a request for an indication of at least one relaying method supported by each of the plurality of first sensory nodes.

20. The method of claim 15, wherein the combined sensing related information further comprises an indication of at least one of a number of other nodes that are reachable from the fusion helper node or an identifier for at least one other node that is reachable from the fusion helper node.

21. The method of claim 15, wherein the data fusion method comprises one of a hard combining technique, a hard combining with side information technique, or a soft combining technique.

22. A dynamic spectrum management (DSM) unit comprising:

a transmitting unit configured to:

transmit a plurality of first sensing response requests to a plurality of first sensory nodes via a plurality of first wireless fusion channels, transmit a request for combined sensing related information to a fusion helper node, wherein the request for combined sensing related information comprises a parameter indicating a data fusion method to be used to combine sensing related information, transmit at least one second sensing response request to at least one second sensory node via at least one second wireless fusion channel, and transmit at least one request for relayed sensing related information to the fusion helper node;

a receiving unit configured to:

receive the combined sensing related information from the fusion helper node, the combined sensing related information comprising first information indicative of a plurality of first sensing response messages received at the fusion helper node from the plurality of first sensory nodes and the parameter indicating the data fusion method used by the fusion helper node to generate the combined sensing related information, and receive the relayed sensing related information from the fusion helper node, the relayed sensing related information comprising second information relayed by the fusion helper node from the at least one second sensory node; and a memory configured to store the combined sensing related information and the relayed sensing related information.

23. The DSM unit of claim 22, wherein the parameter indicates that an AND data fusion method was used by the fusion helper node to generate the combined sensing related information.

\* \* \* \* \*